July 27, 1965  E. F. SALSBURY  3,197,004
CENTRIFUGAL CLUTCH
Filed Jan. 30, 1961
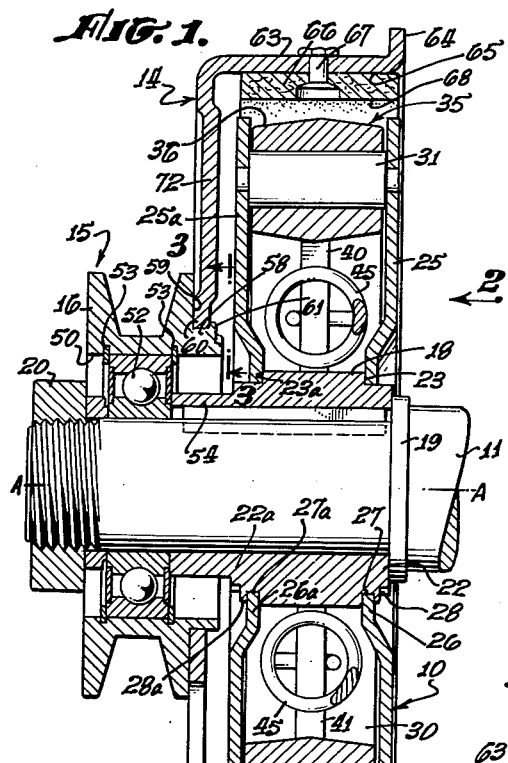
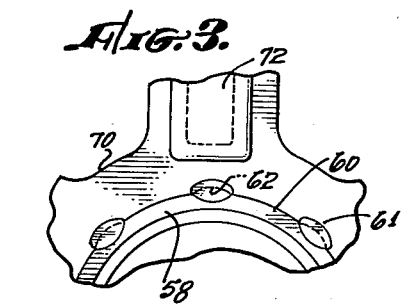
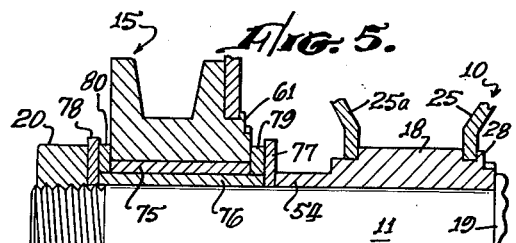
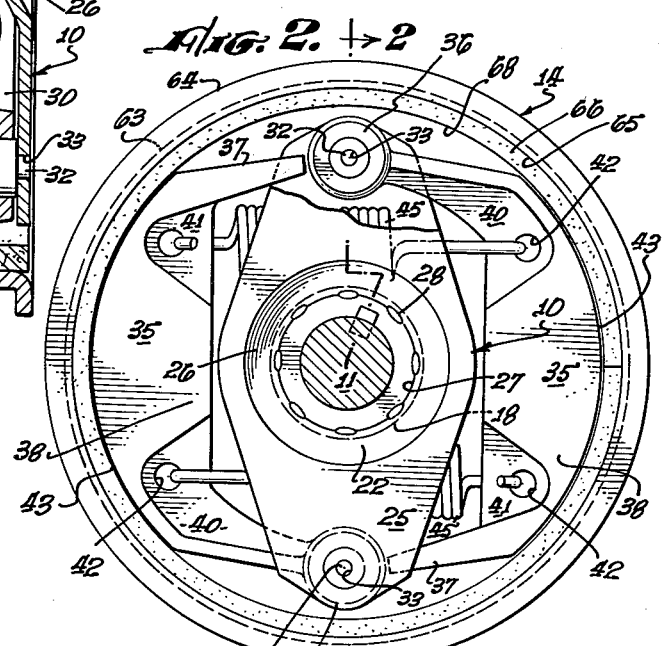
Elsley F. Salsbury,
INVENTOR.
BY His Attorneys.
Harris, Kiech, Russell & Kern.

United States Patent Office 3,197,004
Patented July 27, 1965

3,197,004
CENTRIFUGAL CLUTCH
Esley F. Salsbury, Los Angeles, Calif., assignor, by mesne assignments, to Clarence E. Fleming, Jr., and Clifford R. Anderson, Jr., both of Pasadena, Calif.
Filed Jan. 30, 1961, Ser. No. 85,670
1 Claim. (Cl. 192—105)

My invention relates to automatic clutches of the centrifugal type in which it is desired to clutch a rotating power-driven rotor and a rotatable housing having a power take-off.

Clutches of this general type are known but have left much to be desired in the smoothness of action, the simplicity of construction and the ease with which they can be repaired. Such clutches find wide utility in small vehicles and construction equipment where it is desired progressively to apply an increasing torque to a rotatable housing as an internal combustion engine connected to the power-driven rotor increases in speed.

It is an object of the invention to provide an automatic clutch of the centrifugal type which is of simple design, economical to manufacture and easy to service. Another object is to provide such a clutch having a minimum number of moving parts which are easy to service.

The rotatable housing of the clutch provides an inner cylindrical surface and it is an object of the invention to employ a friction lining extending completely around such surface to provide a continuous surface engageable by shoes of the rotor which are actuated by centrifugal force.

A further object of the invention is to provide an assembled rotor having two or more shoes which tend to be thrown outward by centrifugal force into engagement with the friction lining of the housing but which are restrained by spring means to prevent clutching until the speed of the rotor has increased to a desired extent. A further object is to provide a construction wherein the distances between the points of connection of the spring means to the shoes is a major portion of the inner diameter of the friction lining, which permits the use of springs of maximum length in a device of a given diameter. Such longer springs are important in that they make for more sensitive clutching response and declutching response with variations in speed.

Further objects and advantages of the invention will be apparent to those skilled in the art from the following description of an exemplary embodiment.

In the drawings:

FIG. 1 is a vertical sectional view of a preferred embodiment of the invention;

FIG. 2 is an elevational view of the invention, taken as indicated by the arrow 2 of FIG. 1;

FIG. 3 is a fragmentary view taken along the line 3—3 of FIG. 1;

FIG. 4 is a perspective view of one of the shoes of the invention; and

FIG. 5 is a fragmentary sectional view of an alternative embodiment employing a sleeve bearing.

Referring particularly to FIGS. 1 and 2 the invention includes a power-driven rotor 10 adapted to turn about an axis A—A, as by being mounted on a shaft 11 which may be connected to or a continuation of the crankshaft of an internal combustion engine. The rotor 10 turns within a rotatable housing 14 having a power take-off 15 exemplified as a V-pulley 16.

The rotor 10 includes hub portion 18 suitably keyed to the shaft 11 and forced against a shouldered flange 19 thereof by any suitable means such as a nut 20 threaded to the end of the shaft and acting through a bearing means to be described. The hub portion 18 is a machined element having end portions 22, 22a terminating respectively in shoulders 23, 23a lying in spaced planes that are perpendicular to the axis A—A. Axially spaced rotor plates 25, 25a are stamped of sheet steel and provide central offset portions 26, 26a having openings 27, 27a of a size to slip over the corresponding end portions 22, 22a. The central portions 26, 26a correspondingly fit over the end portions 22, 22a and abut the shoulders 23, 23a respectively. To hold the plates 25, 25a in this position each end portion is deformed at circumferentially spaced positions to provide upset portions 28, 28a which extend outwardly beyond the corresponding plate to hold same to the hub portion 18 and against the corresponding shoulder thereof. The upset portions 28, 28a can be formed by circumferentially spaced punches moving toward the midplane of the rotor 10 in the direction of the axis A—A. Alternate upset portions of each series may be opposite arcuate cut-out segments of the adjacent plates, the deformed metal filling the spaces thus formed to act as keys to take the torque loads, as will later be illustrated and described.

The rotor plates 25, 25a define therebetween an outwardly extending space 30. Pivot pins 31 bridge this space at two or more positions to interconnect the plates. In the preferred arrangement each pivot pin 31 includes axial projections 32 which fit within corresponding holes 33 of the plates. After the rotor is completely assembled each pin projection is welded in place in its respective hole 33.

The rotor 10 includes a number of shoes 35 corresponding to the number of pins 31. In the preferred arrangement two pins and two shoes are employed so that the paired units are on opposite sides of the axis. This construction will be specifically described.

Each shoe 35 includes at one end a pivot boss 36 journaled about the corresponding pivot pin 31 to swing about an axis parallel to but displaced from the axis A—A. The other or free end of each shoe terminates in a tongue portion 37 of a width to move freely in the space 30 between the plates. Each shoe 35 includes a central weight portion 38 that is joined to the pivot boss 36 by a first web portion 40 and to the tongue portion 37 by a second web portion 41, each web portion having an opening 42 therein. Integral with the portions 36–41 inclusive is an arcuate friction flange 43 which preferably extends over an angular distance of approximately 90° although it can be more or less than this value. This friction flange provides a smooth external surface for frictional engagement with the lining of the rotatable housing to be described.

Two of springs 45 are positioned in the space 30. One end of each spring is hooked into the opening 42 of the first web portion 40 of one shoe while the other end of such spring is hooked into the opening of the second web portion 41 of the other shoe. The springs 45 tend to hold the shoes in retracted position from which they depart only as the speed of the shaft 11 increases to a point where the centrifugal force on the shoes overcomes the tension of the springs, permitting the shoes to move outwardly. As will be apparent from FIG. 2, the tongue portion 37 of each shoe engages the pivot boss 36 of the other shoe to limit inward movement under the influence of the springs 45.

The rotatable housing 14 can be made of a single member but preferably is an assemblage of machined and sheet steel elements as shown. It includes a journaled portion which in the preferred embodiment may represent the power-take-off 15. The latter is shown as including a central bore forming a throat 50. The outer race of a ball bearing 52 fits this bore and is held between ring-type retainers 53 with its inner race clamped to the shaft 11 by the nut 20 or other means. It is preferable to provide a neck 54 on the hub portion 18 extending into the throat 50 to provide a surface against which the bearing 52 may abut. If desired a second ball bearing, not shown, may be disposed within the throat 50 to one side of the bearing 52 to aid the journaling action of the latter.

The journaled portion or power-take-off 15 includes a hub or end portion 58 terminating in a shoulder 59 in a plane perpendicular to the axis of rotation. A flange portion 60 of the housing provides a central opening sized to fit over the end portion 58 and abut the shoulder 59. The end portion 58 is deformed at positions spaced circumferentially thereof to provide upset portions 61 which extend outwardly beyond the central opening of the flange portion and hold same to the power take-off and against the shoulder 59 thereof. Alternate upset portions 61 are opposite arcuate cut-out spaces 62 (FIG. 3) punched or cut from the flange 60 so that the deformed metal fills these spaces, acting as keys to take the torque loads. This type of attachment of the flange portion 60 to the hub 58 or the plates 25, 25a to the hub portion 18 avoids welding and produces strong permanent connections of these elements.

The flange portion 60 is preferably made integral with a cylindrical portion 63 terminating in an outwardly flaring circular flange 64 and providing an inner cylindrical surface 65 covered continuously by a unitarily molded or single-joint friction lining 66 held in place by any suitable means such as by bonding or by use of rivets 67. This lining provides a continuous friction surface 68 adapted to be engaged by the arcuate friction flanges 43 of the rotor.

The flange portion 61, the cylindrical portion 63 and the circular flange 64 are preferably stamped from heavy sheet metal. The flange portion 60 is preferably punched to provide openings 70 separated by spokes 72, each of the latter being dished for increased rigidity as suggested in FIGS. 1 and 3.

FIG. 5 illustartes an alternative structure for relatively journaling the rotor 10 and the power-take-off 15 by use of a sleeve bearing 75 such as an oil-impregnated sintered bronze bearing. This bearing surrounds a steel sleeve 76 spaced from the neck 54 by a steel washer 77 and from the nut 20 by a steel washer 78. Tightening the nut 20 clamps the sleeve 76 and the hub portion 18 between the nut and the shouldered flange 19 of the shaft 11 and spaces the steel washers 77, 78 a distance beyond the ends of the bearing 75. Fiber or bronze washers 79 and 80 are positioned in the resulting spaces and serve to take any side thrust of the power-take-off 15.

In operation, the centrifugal clutch remains disengaged until the speed of the shaft 11 is sufficient to move the shoes 35 outward by centrifugal force against the action of the springs 45. The engagement is smooth and the frictional forces driving the housing increase progressively with subsequent increase in shaft speed, producing a versatile control well adapted to many vehicular and stationary uses. The unit is easily disassembled for inspection or replacement of the friction lining 66. The latter has a long life as it extends continuously around the housing and presents a maximum wear area to the shoes.

I claim as my invention:
In a centrifugal clutch, the combination of:
(a) a housing having a power take-off and means for mounting same to turn about an axis;
(b) said housing having an inner cylindrical surface and a friction lining extending completely around said inner cylindrical surface and secured thereto;
(c) a power driven rotor in said housing and mounted to turn about said axis;
(d) said rotor including two diametrically opposed pivot pins paralleling said axis;
(e) two arcuate shoes each having at one end a pivot boss pivoted to one of said pivot pins;
(f) each shoe having an axially-thick central weight portion intermediate its ends, and having on its inner side axially-thin first and second web portions respectively located at circumferentially opposite ends of said central weight portion thereof, said first web portion of each shoe joining said central weight portion thereof, to said pivot boss thereof;
(g) said shoes having on their outer sides outwardly arcuate surfaces within and facing said friction lining;
(h) tension springs each having opposite ends connected to different shoes to draw said shoes inward away from said friction lining except at speeds of the rotor where centrifugal force overcomes the action of said springs and forces said shoes outwardly into frictional engagement with said friction lining; and
(i) each spring having one end connected to said first web portion of one shoe at a first point outwardly of the inner surface of such shoe and adjacent said outwardly arcuate surface thereof, and having its other end connected to said second web portion of the other shoe at a second point outwardly of the inner surface of such other shoe and adjacent said outwardly arcuate surface thereof, the distance between said first and second points of connection of each spring being a major portion of the inner diameter of said friction lining.

References Cited by the Examiner
UNITED STATES PATENTS

| | | | |
|---|---|---|---|
| 1,883,906 | 10/32 | Hasselquist | 29—512 |
| 2,370,199 | 2/45 | Schuckers. | |
| 2,420,100 | 5/47 | Salisburg. | |
| 2,639,794 | 5/53 | McNairy. | |
| 2,677,946 | 5/54 | Purdy. | |
| 2,691,437 | 10/54 | Dalrymple | |
| 2,730,219 | 1/56 | Kitto. | |
| 2,753,967 | 7/56 | Bowers. | |
| 2,762,484 | 9/56 | Hare. | |
| 2,869,699 | 1/59 | Bochan. | |

FOREIGN PATENTS 562,465  5/57  Italy.

DAVID J. WILLAMOWSKY, *Primary Examiner.*
THOMAS J. HICKEY, *Examiner.*